(12) United States Patent
Peng et al.

(10) Patent No.: US 11,088,622 B2
(45) Date of Patent: Aug. 10, 2021

(54) VOLTAGE CONVERTING APPARATUS

(71) Applicant: Chicony Power Technology Co., Ltd., New Taipei (TW)

(72) Inventors: Tso-Jen Peng, New Taipei (TW); Ke-Cheng Chen, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 16/802,531

(22) Filed: Feb. 26, 2020

(65) Prior Publication Data

US 2021/0194372 A1 Jun. 24, 2021

(30) Foreign Application Priority Data

Dec. 24, 2019 (TW) ................................ 108147469

(51) Int. Cl.
*H02M 3/335* (2006.01)
*H02M 1/08* (2006.01)

(52) U.S. Cl.
CPC ......... *H02M 3/33523* (2013.01); *H02M 1/08* (2013.01)

(58) Field of Classification Search
CPC .............................. H02M 3/33523; H02M 1/08
See application file for complete search history.

(56) References Cited

U.S. PATENT DOCUMENTS

| 6,597,159 | B2 * | 7/2003 | Yang | ................. | H02M 3/33507 |
| | | | | | 323/283 |
| 7,061,780 | B2 * | 6/2006 | Yang | ...................... | H02M 1/44 |
| | | | | | 363/21.13 |
| 7,635,956 | B2 | 12/2009 | Huynh et al. | | |
| 7,924,579 | B2 | 4/2011 | Arduini | | |
| 8,988,902 | B2 | 3/2015 | Gao et al. | | |
| 9,350,252 | B2 | 5/2016 | Zhang et al. | | |
| 10,218,280 | B2 | 2/2019 | Chang et al. | | |
| 2018/0054131 | A1* | 2/2018 | Lin | ................... | H02M 3/33507 |
| 2018/0367027 | A1* | 12/2018 | Chen | ...................... | H02M 3/156 |
| 2020/0303941 | A1* | 9/2020 | Inoue | ....................... | H02J 7/06 |

FOREIGN PATENT DOCUMENTS

| CN | 106533179 | 3/2017 |
| CN | 206400035 | 8/2017 |
| TW | 200607216 | 2/2006 |
| TW | M312119 | 5/2007 |
| TW | I402653 | 7/2013 |
| TW | I465014 | 12/2014 |
| TW | 201817110 | 5/2018 |
| TW | 201820760 | 6/2018 |

OTHER PUBLICATIONS

"Office Action of Taiwan Counterpart Application", dated Jun. 6, 2020, p. 1-p. 4.

* cited by examiner

*Primary Examiner* — Kyle J Moody
(74) *Attorney, Agent, or Firm* — JCIPRNET

(57) ABSTRACT

A voltage converting apparatus is provided. A control circuit connects a disturbance element to a voltage-dividing resistor network to disturb a feedback voltage and generate a detection voltage during a resistance detection period, and determines whether the voltage-dividing resistor network is aging according to the detection voltage.

10 Claims, 4 Drawing Sheets

VOLTAGE CONVERTING APPARATUS

CROSS-REFERENCE TO RELATED APPLICATION

This application claims the priority benefit of Taiwan application serial no. 108147469, filed on Dec. 24, 2019. The entirety of the above-mentioned patent application is hereby incorporated by reference herein and made a part of this specification.

BACKGROUND

Technical Field

The disclosure relates to an electronic apparatus, and more particularly, to a voltage converting apparatus.

Description of Related Art

A traditional flyback power converter can achieve the purpose of electrical isolation by using an opto-coupler to feedback an output voltage. However, opto-couplers are susceptible to the influence of operating temperature. Therefore, the development of primary-side sensing methods to replace opto-couplers has become the current development trend.

In the design of current flyback power converters, designers usually compare the detected output voltage with a set value and use the comparison result as the basis for controlling the power conversion operation. For example, a general power conversion control operation usually increases the on-time of the power switch to increase the output power when the detected output voltage is less than the set value, and decreases the on-time of the power switch to reduce the output power when the detected output voltage is greater than the set value, so as to maintain the dynamic balance of the output power at the set value.

However, although this type of control method can maintain the dynamic stability of the output voltage, when the voltage-dividing resistor in the feedback circuit is damaged due to aging or other factors, it causes the output voltage to be abnormal. Therefore, it is an important issue to detect whether the voltage-dividing resistor has become abnormal.

SUMMARY

The disclosure provides a voltage converting apparatus that can effectively detect whether a voltage-dividing resistor has become abnormal and can perform over output voltage protection and low output voltage protection.

A voltage converting apparatus of the disclosure includes a transformer circuit, a feedback circuit, a first switch and a control circuit. The transformer circuit includes a primary-side coil and a secondary-side coil. The feedback circuit includes a voltage-dividing resistor network, wherein the feedback circuit generates a feedback voltage through the voltage-dividing resistor network in response to an output of the secondary-side coil. The first switch is coupled to the transformer circuit. The control circuit is coupled to the first switch and the feedback circuit and switches an operation state of the first switch according to the feedback voltage to control an output of the transformer circuit, wherein the control circuit further includes a disturbance element, and the control circuit connects the disturbance element to the voltage-dividing resistor network to disturb the feedback voltage and generate a detection voltage during a resistance detection period, wherein the resistance detection period falls within an off period of the first switch, and wherein the control circuit determines whether the voltage-dividing resistor network is aging according to the detection voltage.

In an embodiment of the disclosure, the control circuit determines whether the detection voltage falls within a preset voltage range, and if the detection voltage falls within the preset voltage range, the control circuit determines that the voltage-dividing resistor network is not aging.

In an embodiment of the disclosure, the preset voltage range is determined according to the detection voltage generated by the control circuit disturbing the feedback voltage for a first time.

In an embodiment of the disclosure, the control circuit further includes a second switch coupled between an output terminal of the voltage-dividing resistor network and the disturbance element, wherein the second switch is controlled by the control circuit and is turned on during the resistance detection period.

In an embodiment of the disclosure, the disturbance element includes a resistor coupled between the second switch and a ground.

In an embodiment of the disclosure, the control circuit further includes a DC voltage source coupled between the resistor and the ground.

In an embodiment of the disclosure, the feedback circuit further includes a voltage source providing a voltage in response to the output of the secondary-side coil, wherein the voltage-dividing resistor network divides the voltage to generate the feedback voltage.

In an embodiment of the disclosure, the voltage-dividing resistor network includes a first resistor and a second resistor. The second resistor and the first resistor are coupled between the voltage source and a ground, and the first resistor and the second resistor divide the voltage and output the feedback voltage at a common junction of the first resistor and the second resistor.

In an embodiment of the disclosure, the voltage source is an auxiliary coil.

In an embodiment of the disclosure, the control circuit further includes a sampling circuit, a comparator and a driving control circuit. The sampling circuit is coupled to the feedback circuit and samples the feedback voltage and the detection voltage to generate a sampled feedback voltage and a sampled detection voltage correspondingly. Positive and negative input terminals of the comparator are respectively coupled to a reference voltage and the sampling circuit, wherein the comparator compares the sampled feedback voltage with the reference voltage to generate a comparison signal. The driving control circuit is coupled to an output terminal of the comparator and a control terminal of the first switch, switches a conduction state of the first switch according to the comparison signal, and further determines whether the voltage-dividing resistor network is aging according to the comparison signal.

Based on the above, the control circuit of the embodiments of the disclosure may connect the disturbance element to the voltage-dividing resistor network to disturb the feedback voltage and generate the detection voltage during the resistance detection period and may determine whether the voltage-dividing resistor network is aging according to the detection voltage, so as to perform over output voltage protection or low output voltage protection correspondingly when it determines that the voltage-dividing resistor network is aging, wherein the resistance detection period falls within the off period of the first switch that controls the output of the transformer circuit.

DESCRIPTION OF THE EMBODIMENTS

Figure 1:
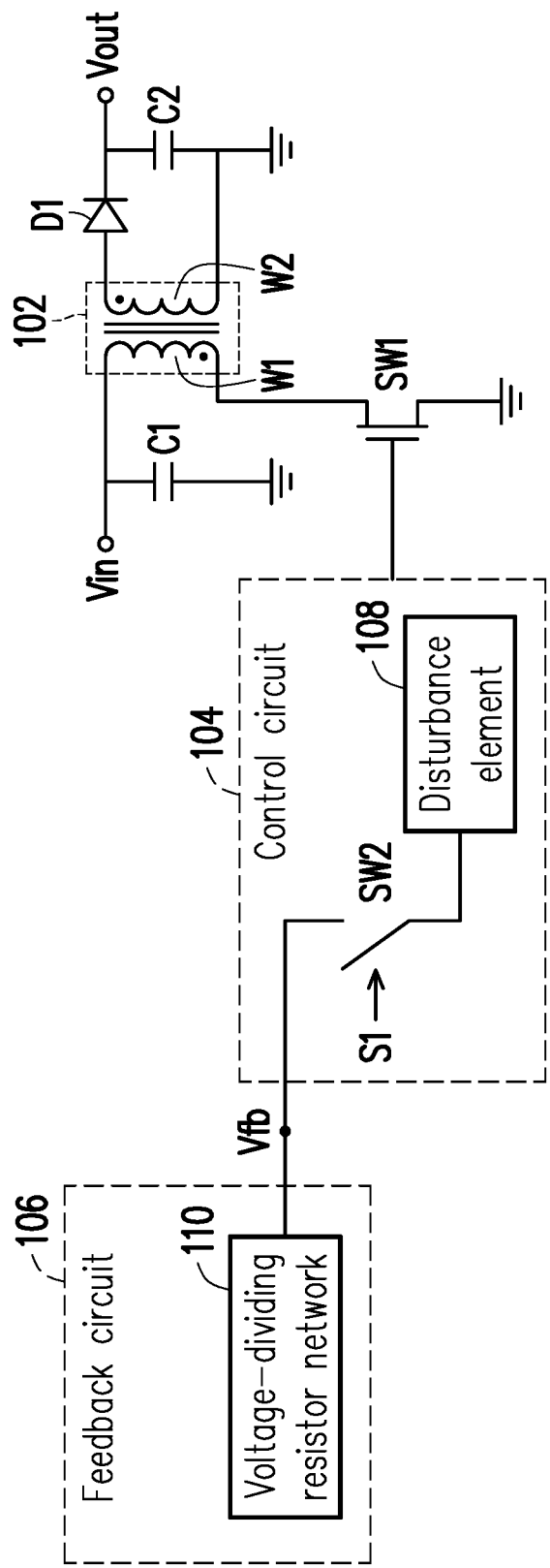
FIG. 1 is a schematic diagram of a voltage converting apparatus according to an embodiment of the disclosure.

FIG. 1 is a schematic diagram of a voltage converting apparatus according to an embodiment of the disclosure. Please refer to FIG. 1. The voltage converting apparatus may be, for example, a flyback converter, which includes a transformer circuit 102, a control circuit 104, a feedback circuit 106, and a switch SW1. The input terminal of the transformer circuit 102 is configured to receive a DC input voltage Vin obtained by rectifying an AC voltage. The feedback circuit 106 is coupled to the control circuit 104. The switch SW1 is coupled to the transformer circuit 102 and the control circuit 104.

Further, the transformer circuit 102 may include, for example, a primary-side coil W1 and a secondary-side coil W2. The input terminal of the transformer circuit 102 is coupled to one terminal of a capacitor C1. One terminal of the capacitor C1 is coupled to the ground. The output terminal of the transformer circuit 102 is coupled to a diode D1 and a capacitor C2. The anode and cathode of the diode D1 are respectively coupled to the secondary-side coil W2 and the output terminal of the voltage converting apparatus, and the capacitor C2 is coupled between the cathode of the diode D1 and the ground. The transformer circuit 102 may be configured to convert the input voltage Vin and to generate an output voltage Vout at the output terminal of the voltage converting apparatus through the diode D1.

The feedback circuit 106 includes a voltage-dividing resistor network 110, and the feedback circuit 106 may generate a feedback voltage Vfb through the voltage-dividing resistor network 110 in response to the output of the secondary-side coil W2. The control circuit 104 may control the conduction state of the switch SW1 (in the embodiment, the switch SW1 is implemented by a transistor) according to the feedback voltage Vfb, thereby controlling the output of the transformer circuit 102.

The control circuit 104 includes a disturbance element 108, and the control circuit 104 may connect the disturbance element 108 to the voltage-dividing resistor network 110 to disturb the feedback voltage Vfb and generate a detection voltage during a resistance detection period, wherein the resistance detection period falls within the off period of the switch SW1. For example, as shown in FIG. 1, the control circuit 104 may include a switch SW2. The switch SW2 is coupled between the voltage-dividing resistor network 110 and the disturbance element 108. The control circuit 104 may output a control signal Si to control the conduction state of the switch SW2, thereby controlling the connection state of the disturbance element 108 and the voltage-dividing resistor network 110. The control circuit 104 may determine whether the voltage-dividing resistor network 110 is aging or is abnormal according to the detection voltage, and may perform over output voltage protection or low output voltage protection correspondingly, so as to prevent the output voltage Vout of the voltage converting apparatus from being abnormal and causing a product to which the voltage converting apparatus is applied to be damaged.

For example, the control circuit 104 may determine whether the detection voltage falls within a preset voltage range. If the detection voltage falls within the preset voltage range, the control circuit 104 may determine that the voltage-dividing resistor network 110 is not aging. The preset voltage range may be determined, for example, according to the detection voltage generated by the control circuit 104 disturbing the feedback voltage Vfb for the first time, but it is not limited thereto, and the preset voltage range may be determined according to the detection voltage obtained by disturbing the feedback voltage Vfb when the voltage-dividing resistor network 110 is not aging or is not abnormal.

Figure 2:
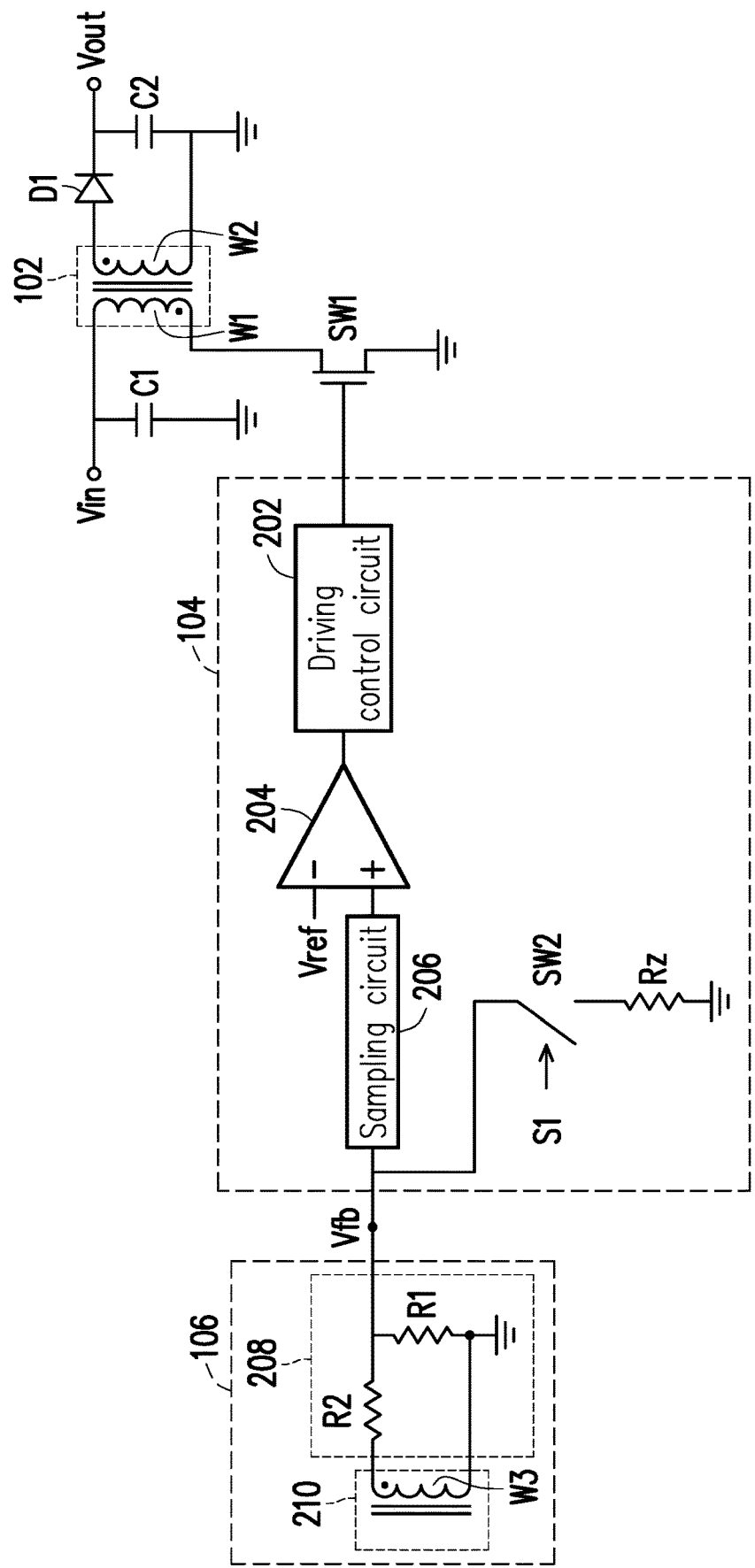
FIG. 2 is a schematic diagram of a voltage converting apparatus according to another embodiment of the disclosure.

FIG. 2 is a schematic diagram of a voltage converting apparatus according to another embodiment of the disclosure. Further, an embodiment of the voltage converting apparatus may be as shown in FIG. 2. In the embodiment of FIG. 2, the disturbance element 108 is implemented by a resistor Rz, but it is not limited thereto. The resistor Rz is coupled between the switch SW2 and the ground. In addition, the control circuit 104 further includes a driving control circuit 202, a comparator 204, and a sampling circuit 206. The sampling circuit 206 is coupled to the output terminal of the feedback circuit 106 and the positive input terminal of the comparator 204. The negative input terminal of the comparator 204 is coupled to a reference voltage Vref. The output terminal of the comparator 204 is coupled to the driving control circuit 202. The driving control circuit 202 is further coupled to the control terminal of the switch SW1. In addition, the feedback circuit 106 in the embodiment may include a voltage source 210 and a voltage-dividing resistor network 208. The voltage source 210 is coupled to the voltage-dividing resistor network 208. The voltage-dividing resistor network 208 is further coupled to the sampling circuit 206.

The voltage source 210 may provide a voltage to the voltage-dividing resistor network 208 in response to the output of the secondary-side coil W2. The voltage-dividing resistor network 208 may divide the voltage provided by the voltage source 210 to generate the feedback voltage Vfb. In the embodiment, the voltage source 210 may be implemented by, for example, an auxiliary coil W3, but it is not limited thereto. In addition, the voltage-dividing resistor network 208 may be implemented by, for example, resistors R1 and R2, but it not limited thereto, wherein the resistor R2 is coupled between the auxiliary coil W3 and the output terminal of the voltage-dividing resistor network 208, and the resistor R1 is coupled between the output terminal of the voltage-dividing resistor network 208 and the ground. The resistors R1 and R2 may divide the voltage provided by the voltage source 210 to generate the feedback voltage Vfb at a common junction of the resistors R1 and R2.

Figure 3:
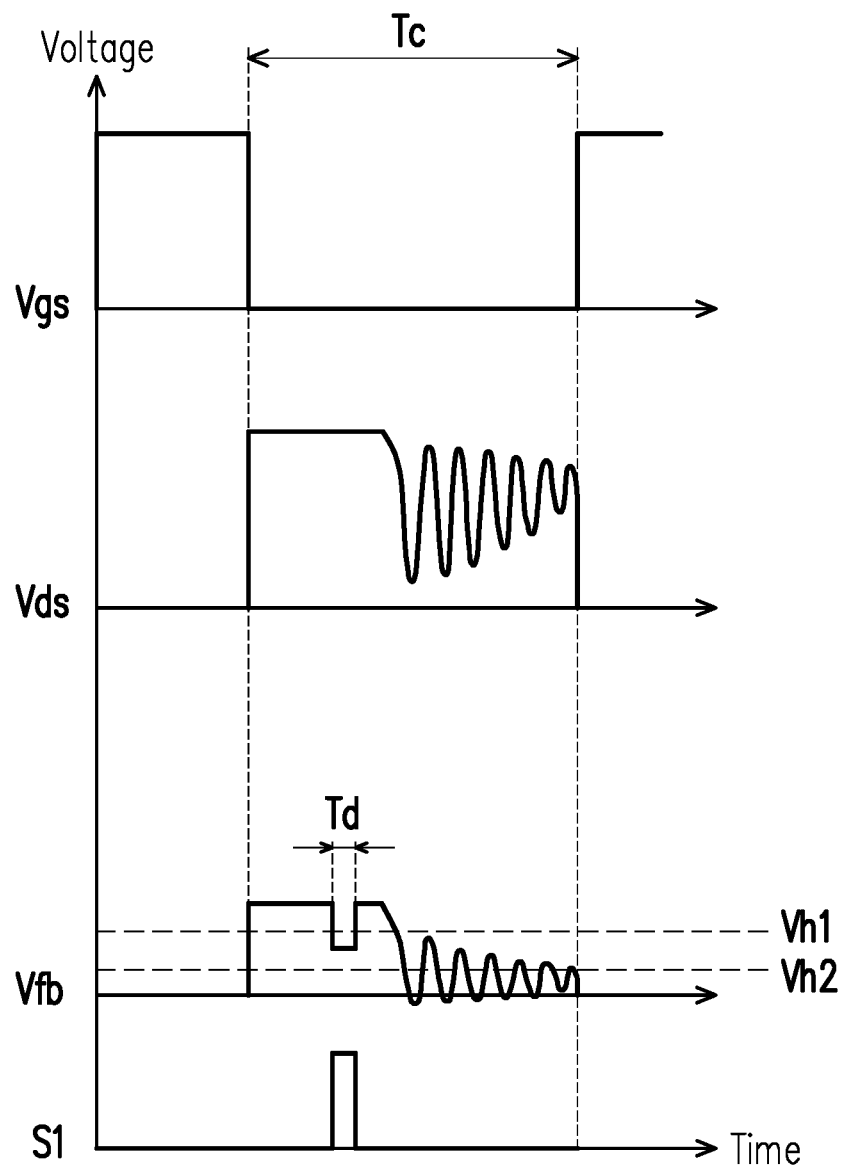
FIG. 3 is a schematic diagram of a voltage waveform according to an embodiment of the disclosure.

As shown in FIG. 3, during a period Tc when the switch SW1 is turned off, that is, during the period when a gate-source voltage Vgs of the switch SW1 is at a low voltage level, a drain-source voltage Vds of the switch SW1 is pulled up correspondingly. Then, when the output current of the transformer circuit 102 linearly drops to near 0, the diode D1 is turned off, and the magnetic inductance of the transformer circuit 102 resonates with the parasitic capacitance of the main switch SW1, so that the drain-source voltage Vds on the switch SW1 oscillates accordingly, and the feedback voltage Vfb also oscillates correspondingly at this time. The control circuit 104 turns the control signal Si to a high voltage level before the drain-source voltage Vds on the switch SW1 oscillates, so that the switch SW2 is turned on; that is, the switch SW2 is turned on in a resistance detection period Td shown in FIG. 3, so that the resistor Rz is connected to the common junction of the resistors R1 and R2. At this time, the feedback voltage Vfb decreases because the resistor Rz is connected to the common junction of the resistors R1 and R2.

The sampling circuit 206 is configured to sample the feedback voltage Vfb to generate a sampled feedback voltage, wherein the feedback voltage Vfb whose voltage value decreases due to the disturbance of the resistor Rz in the resistance detection period Td is the detection voltage. During the resistance detection period Td, the sampling circuit 206 may sample the detection voltage to generate a sampled detection voltage. The comparator 204 may compare the sampled feedback voltage with the reference voltage Vref to generate a comparison signal, and the driving control circuit 202 may switch the conduction state of the switch SW1 according to the comparison signal and may determine whether the voltage-dividing resistor network 208 is aging according to the voltage value of the comparison signal during the resistance detection period Td.

Further, depending on the aging conditions of the resistors R1 and R2, the magnitude of the voltage decrease of the feedback voltage Vfb during the resistance detection period Td varies; that is, the sampled detection voltage sampled by the sampling circuit 206 may have different voltage values. For example, the reference voltage Vref may be set to an acceptable minimum sampled detection voltage, and when the sampled detection voltage is lower than the reference voltage Vref, the control circuit 104 may switch the conduction state of the switch SW1 to perform low voltage protection. Alternatively, the reference voltage Vref may be set to an acceptable maximum sampled detection voltage, and when the sampled detection voltage is higher than the reference voltage Vref, the control circuit 104 may switch the conduction state of the switch SW1 to perform over voltage protection.

In some embodiments, the comparator 204 may be designed to compare the sampled detection voltage with different preset voltages, so that the control circuit 104 may determine whether to perform over voltage protection or low voltage protection according to the magnitude of the sampled detection voltage. For example, when the sampled detection voltage is between preset voltages Vh1 and Vh2 shown in FIG. 3, that is, when the sampled detection voltage falls within the preset voltage range, the control circuit 104 may determine that the voltage-dividing resistor network 208 is not aging. When the sampled detection voltage is higher than the preset voltage Vh1 or lower than the preset voltage Vh2, that is, when the detection voltage falls outside the preset voltage range, the control circuit 104 may determine that the voltage-dividing resistor network 208 is aging or is abnormal, and the control circuit 104 may control the conduction state of the switch SW1 to perform over voltage protection or low voltage protection. For example, the control circuit 104 may put the switch SW1 into the off state; that is, the switch SW1 is disabled.

Figure 4:
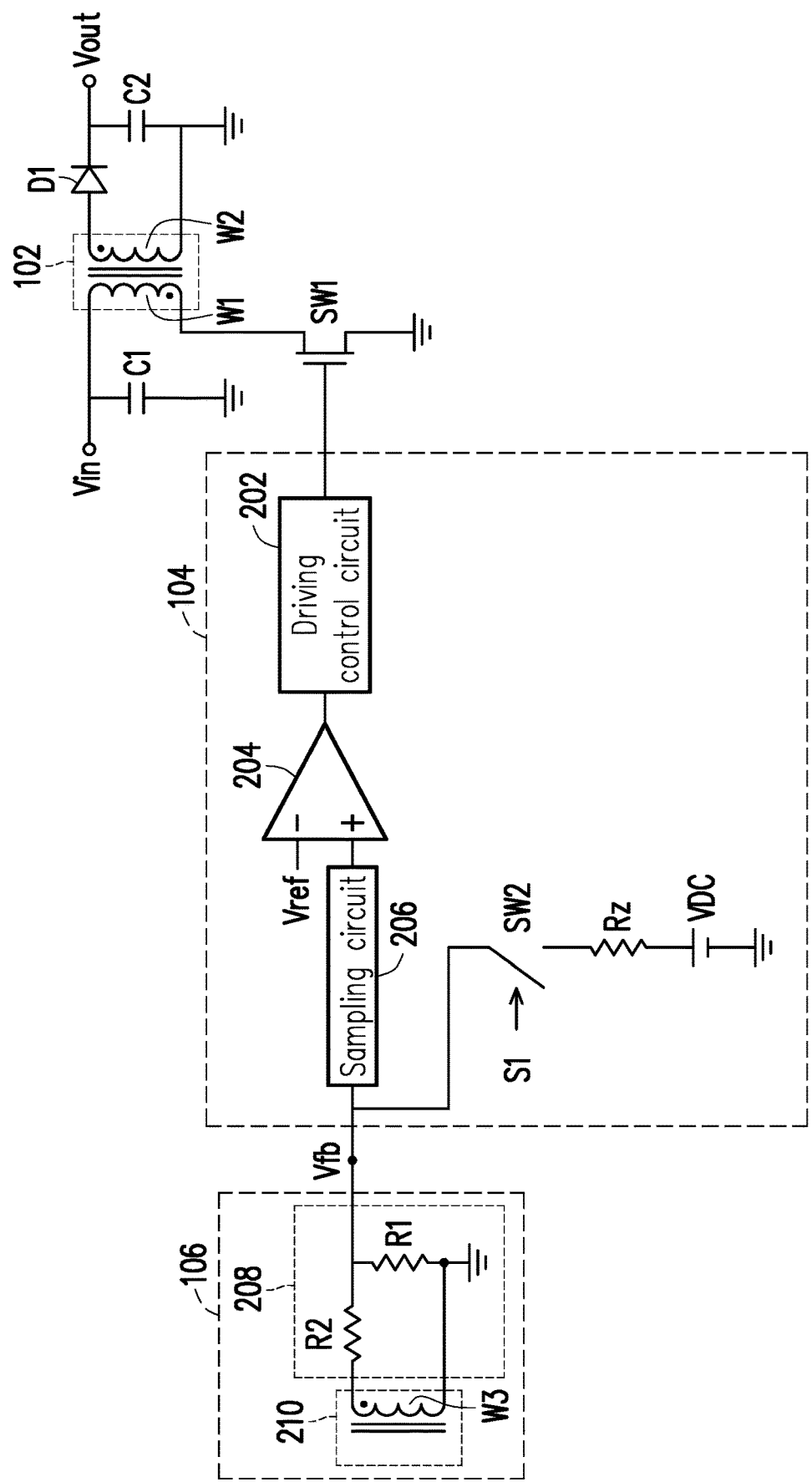
FIG. 4 is a schematic diagram of a voltage converting apparatus according to another embodiment of the disclosure.

In addition, in the embodiment of FIG. 2, the resistor Rz is coupled between the switch SW2 and the ground, but in other embodiments, the resistor Rz may be coupled between the switch SW2 and a specific voltage (a DC voltage source VDC as shown in FIG. 4, for example). In this way, the voltage value of the detection voltage during the resistance detection period Td may be adjusted through this specific voltage, so that the circuit design is more flexible.

In summary, the control circuit of the embodiments of the disclosure connects the disturbance element to the voltage-dividing resistor network to disturb the feedback voltage and generate the detection voltage during the resistance detection period. The control circuit may determine whether the voltage-dividing resistor network is aging according to the detection voltage and may perform over output voltage protection or low output voltage protection correspondingly, wherein the resistance detection period falls within the off period of the first switch that controls the output of the transformer circuit.

What is claimed is:

1. A voltage converting apparatus, comprising:
   a transformer circuit comprising a primary-side coil and a secondary-side coil;
   a feedback circuit comprising a voltage-dividing resistor network, wherein the feedback circuit generates a feedback voltage through the voltage-dividing resistor network in response to an output of the secondary-side coil;
   a first switch coupled to the transformer circuit; and
   a control circuit coupled to the first switch and the feedback circuit and switching an operation state of the first switch according to the feedback voltage to control an output of the transformer circuit, wherein the control circuit further comprises a disturbance element, and the control circuit connects the disturbance element to the voltage-dividing resistor network to disturb the feedback voltage and generate a detection voltage during a resistance detection period, wherein the resistance detection period falls within an off period of the first switch, and wherein the control circuit determines whether the voltage-dividing resistor network is aging according to the detection voltage.

2. The voltage converting apparatus according to claim 1, wherein the control circuit determines whether the detection voltage falls within a preset voltage range, and if the detection voltage falls within the preset voltage range, the control circuit determines that the voltage-dividing resistor network is not aging.

3. The voltage converting apparatus according to claim 2, wherein the preset voltage range is determined according to the detection voltage generated by the control circuit disturbing the feedback voltage for a first time.

4. The voltage converting apparatus according to claim 1, wherein the control circuit further comprises:
   a second switch coupled between an output terminal of the voltage-dividing resistor network and the disturbance element, wherein the second switch is controlled by the control circuit and is turned on during the resistance detection period.

5. The voltage converting apparatus according to claim 4, wherein the disturbance element comprises:
   a resistor coupled between the second switch and a ground.

6. The voltage converting apparatus according to claim 5, wherein the control circuit further comprises:
   a DC voltage source coupled between the resistor and the ground.

7. The voltage converting apparatus according to claim 5, wherein the feedback circuit further comprises:
   a voltage source providing a voltage in response to the output of the secondary-side coil, wherein the voltage-dividing resistor network divides the voltage to generate the feedback voltage.

8. The voltage converting apparatus according to claim 7, wherein the voltage-dividing resistor network comprises:

a first resistor; and a second resistor, wherein the second resistor and the first resistor are coupled between the voltage source and a ground, and the first resistor and the second resistor divide the voltage and output the feedback voltage at a common junction of the first resistor and the second resistor.

9. The voltage converting apparatus according to claim 7, wherein the voltage source is an auxiliary coil.

10. The voltage converting apparatus according to claim 1, wherein the control circuit further comprises:

a sampling circuit coupled to the feedback circuit and sampling the feedback voltage and the detection voltage to generate a sampled feedback voltage and a sampled detection voltage correspondingly;

a comparator whose positive and negative input terminals are respectively coupled to a reference voltage and the sampling circuit, wherein the comparator compares the sampled feedback voltage with the reference voltage to generate a comparison signal; and a driving control circuit coupled to an output terminal of the comparator and a control terminal of the first switch, switching a conduction state of the first switch according to the comparison signal, and further determining whether the voltage-dividing resistor network is aging according to the comparison signal.

* * * * *